(12) United States Patent
Widmark et al.

(10) Patent No.: US 9,537,960 B2
(45) Date of Patent: Jan. 3, 2017

(54) MULTI-OPERATOR TELECOMMUNICATION DISTRIBUTION OF SERVICE CONTENT

(75) Inventors: Jerker Widmark, Sundbyberg (SE); Rolf Blom, Jarfalla (SE); Steinar Dahlin, Jarfalla (SE); Clary Hallberg Dahlin, legal representative, Jarfalla (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 2322 days.

(21) Appl. No.: 11/910,361

(22) PCT Filed: Apr. 1, 2005

(86) PCT No.: PCT/SE2005/000483
§ 371 (c)(1),
(2), (4) Date: Jun. 13, 2008

(87) PCT Pub. No.: WO2006/104433
PCT Pub. Date: Oct. 5, 2006

(65) Prior Publication Data
US 2009/0068998 A1   Mar. 12, 2009

(51) Int. Cl.
*H04M 11/00* (2006.01)
*H04L 29/08* (2006.01)
(Continued)

(52) U.S. Cl.
CPC .............. *H04L 67/20* (2013.01); *H04L 67/26* (2013.01); *H04L 67/306* (2013.01); *H04M 3/42008* (2013.01); *H04W 8/18* (2013.01)

(58) Field of Classification Search
CPC ........ H04L 67/20; H04L 67/26; H04L 67/306; H04M 3/42008; H04W 8/18
(Continued)

(56) References Cited

U.S. PATENT DOCUMENTS 6,968,175 B2 * 11/2005 Raivisto et al. .............. 455/406
7,239,871 B2 *  7/2007 Shamp et al. ............. 455/422.1
(Continued)

FOREIGN PATENT DOCUMENTS

JP   2001-350788 A   12/2001
JP   2003-108664 A    4/2003
WO  WO 03/085930 A1  10/2003

*Primary Examiner* — Andrew Sasinowski
*Assistant Examiner* — Kuo Woo

(57) ABSTRACT

A solution making it possible for one telecommunication network operator (10') to act as intermediate distributor or administrator of a content provider (60) for a multitude of operators (20) is presented. The content provider (60) has a single relation to the central operator (10'), in turn having relations to other operators (20). It is thus possible for the content provider (60) to reach all users (30) of all operators (10', 20) through a single relation to that operator (10'). The content provider (60) provides service content, e.g. media content. A list of targeted users (30) or subscribers is compiled. The central operator (10') collects necessary subscriber attributes (80), such as position, device information and access properties, from the other operators (20). The content is modified according to the collected attributes (80), and the content is distributed to the subscribers (30) in the best possible way.

28 Claims, 9 Drawing Sheets

(51) Int. Cl.
*H04M 3/42* (2006.01)
*H04W 8/18* (2009.01)

(58) Field of Classification Search
USPC 455/414, 414.2, 406, 422.1; 709/225; 726/2
See application file for complete search history.

(56) References Cited

U.S. PATENT DOCUMENTS

| | | | |
|---|---|---|---|
| 2002/0077084 A1* | 6/2002 | Zellner et al. | 455/414 |
| 2003/0037139 A1* | 2/2003 | Shteyn | 709/225 |
| 2004/0203630 A1 | 10/2004 | Wang | |
| 2004/0248561 A1* | 12/2004 | Nykanen et al. | 455/414.2 |
| 2006/0253894 A1* | 11/2006 | Bookman et al. | 726/2 |

* cited by examiner

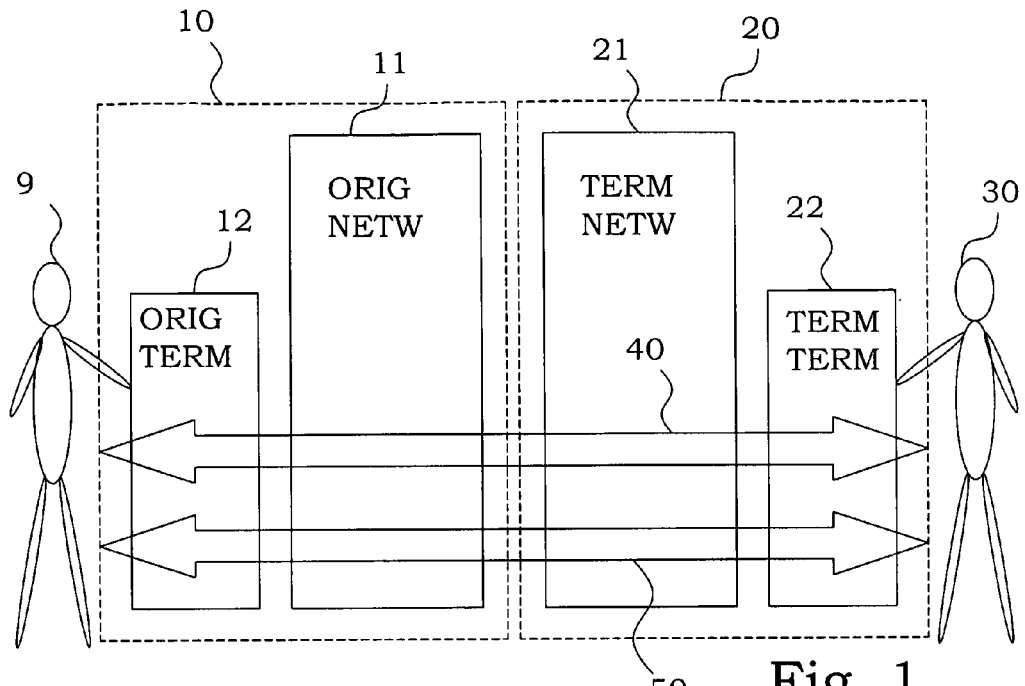
Fig. 1
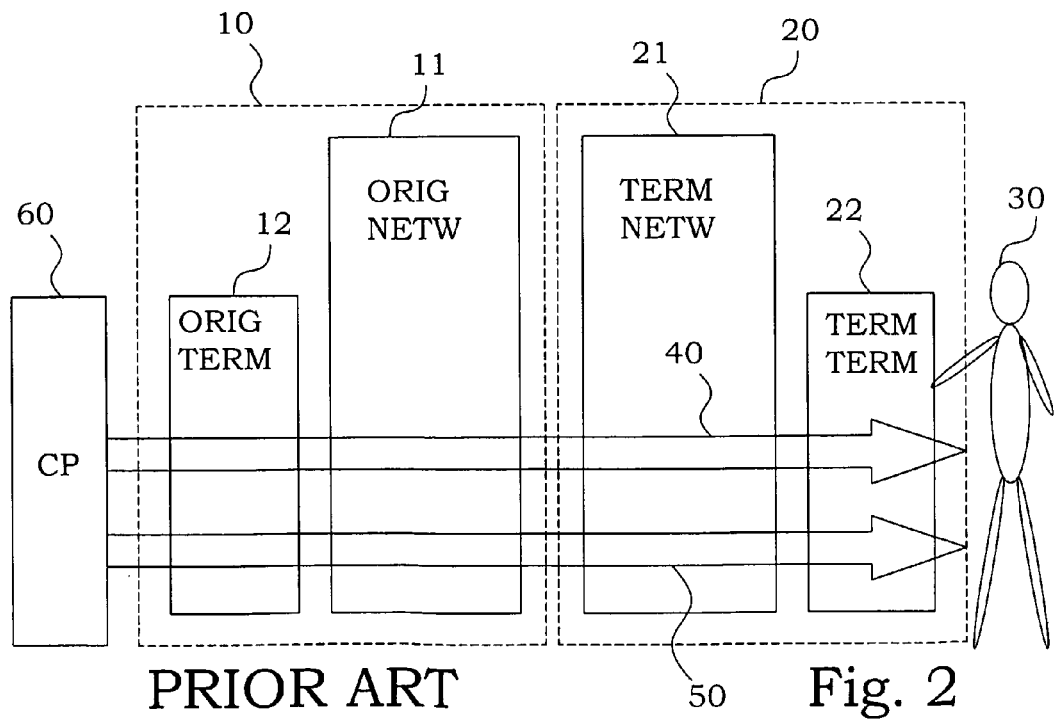
PRIOR ART    Fig. 2

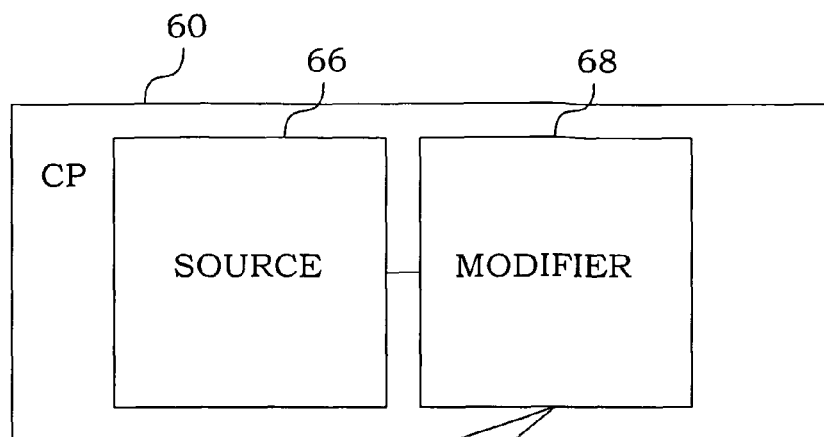
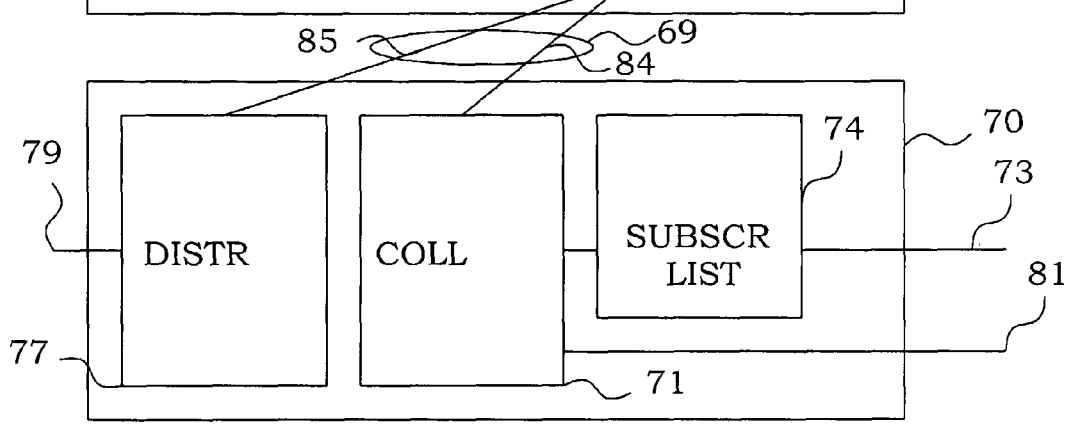
Fig. 6B
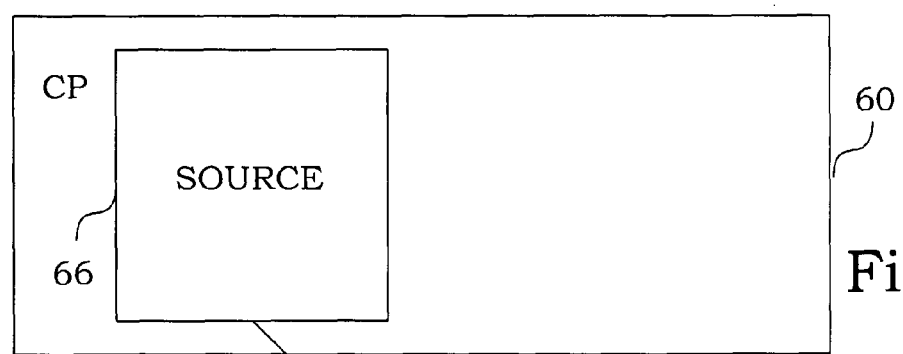
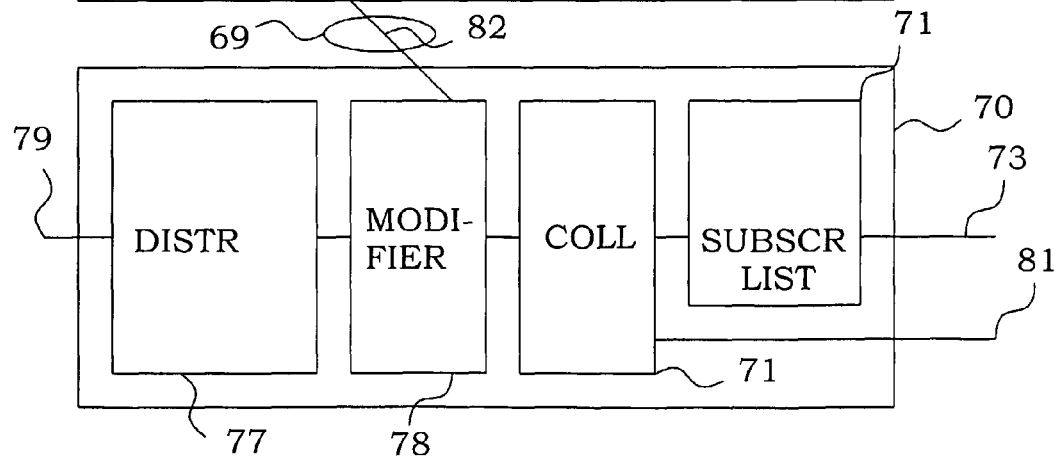
Fig. 6C

MULTI-OPERATOR TELECOMMUNICATION DISTRIBUTION OF SERVICE CONTENT

TECHNICAL FIELD

The present invention relates in general to communication of service content and in particular to such communication over telecommunication operator borders.

BACKGROUND

Telecommunication operators are today building up several standardized routing capabilities for communication services, sessions and/or media across their collective networks. The motive force is to be able to provide person-to-person connectivity for anyone-to-anyone regardless of particular user-operator relations. Examples of routing capabilities of these services, sessions and/or media are telephony, SMS, MMS, IMPS, Email and now also the coming IMS. Each of these examples has their own addressing structure that makes it possible to route from any user to any other user active within the specific addressing, service or session scheme.

Content providers of different service contents, e.g. communication service content, media content etc., have need for distributing their service content to specified users. In typical cases, a large number of users spread being associated with a number of different operators are the tentative targets for such service content. To this end, content providers can use the routing structures described above just as any other user can, and they will in such a case also be considered as a "normal" user. The content providers can in that way route their service content to anyone desiring it. However, delivering service content when acting as a user among other users has some drawbacks, mainly in terms of ability to adapt the actual content to the type of terminal the content is delivered to and/or the type of access the content is delivered through.

Another alternative that is available for content providers is to create a direct relation to the different operators. Such relations can provide access to current terminal capabilities of the users associated with the operator and the operator access capabilities by making use of the operator's third party interfaces. This becomes a way to obtain e.g. the position of a targeted user, which may be important for the actual delivery of the content. However, in order to be able to provide the service to all possible users, the content provider has to create such relation to all operators of interest. Since there are numerous operators spread over the entire globe, such relations might be difficult to obtain, at least for smaller content providers. This procedure leads to that this approach is very time consuming, administratively difficult and costly for the content provider. There is thus a high barrier for any content provider to use such solutions.

SUMMARY

A general problem with prior art telecommunications systems is that it is difficult to provide service content to a multitude of targeted users of different telecommunication operators in a manner that is well suited to individual terminal and access capabilities.

A general object of the present invention is thus to improve service content distribution from content providers over the collective network of a multitude of telecommunication operators to targeted users. A further object of the present invention is to provide methods and arrangements facilitating creation of relations between a content provider and a multitude of telecommunication operators. A subsidiary object of the present invention is to create a communication structure enabling a higher development speed of end user applications.

The above objects are achieved by methods and arrangements according to the enclosed patent claims. In general words, the basic concept of the present invention is a technical solution making it possible for one operator to act as an intermediate administrator, handler or distributor for all operators. A content provider has a single relation to one central network operator. This intermediate central network operator has relations to a number of other operators. In this manner it is possible for the content provider to reach all users of all operators having a relation to the central network operator through one single relation to one single operator. The content provider provides the communication content. A list of targeted users or subscribers is compiled, either at the content provider or at the central network operator. The central network operator collects necessary subscriber attributes, such as position, device information and access properties, from the other operators. The communication content is modified according to the collected attributes, either at the content provider or at the central network operator, and the content can finally be distributed or delivered to the targeted subscribers in the best possible way.

An advantage with such an arrangement is that it constitutes a structure, which enables a high development speed of end user applications. The invention provides possibilities that not all services have to be identically implemented at all operators. Instead, the services are usable through all operators as implemented in one.

BRIEF DESCRIPTION OF THE DRAWINGS

The invention, together with further objects and advantages thereof, may best be understood by making reference to the following description taken together with the accompanying drawings, in which:

FIG. 1 is a block scheme illustrating routing capabilities across operator borders;

FIG. 2 is a block scheme of a prior art system for content provision;

FIG. 6B is a block scheme of another embodiment of a content provider and an embodiment of a content handling subsystem of a central network operator according to the present invention;

FIG. 6C is a block scheme of yet another embodiment of a content provider and an embodiment of a content handling subsystem of a central network operator according to the present invention;

DETAILED DESCRIPTION

Figure 3:
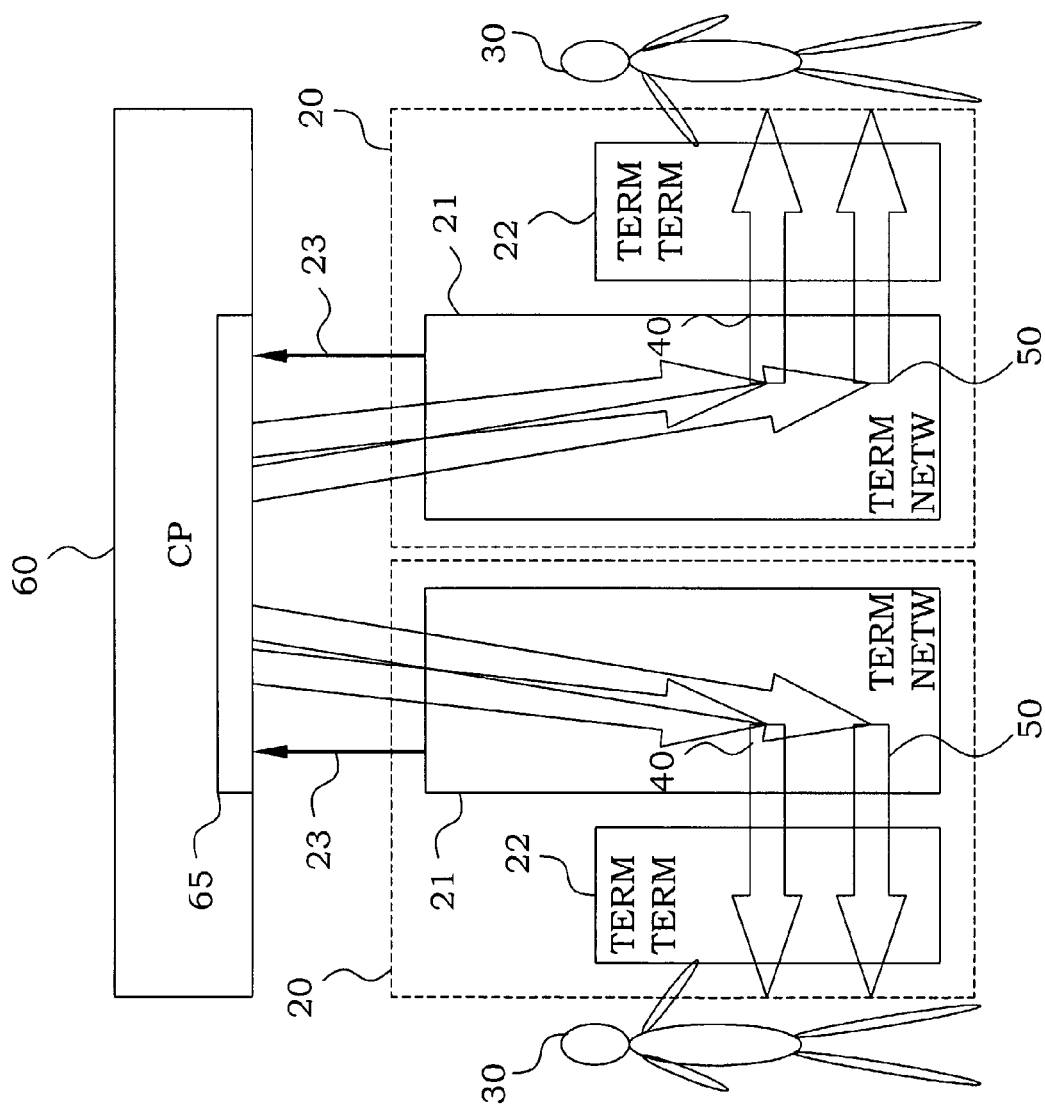
FIG. 3 is a block scheme of another prior art system for content provision.

In telecommunication networks of today, routing capabilities for services, sessions and media across operator boundaries are well established. FIG. 1 visualise such arrangements by a schematic block scheme. An originating user 9, being a subscriber of an originating network operator 10, wants to distribute e.g. media content to a terminating user 30, being a subscriber of a terminating network operator 20. An originating terminal 12, connected to an originating network 11 provides the media content, which is transferred via the originating network 11 and a terminating network 21 to a terminating terminal 22. By using addressing structures of a particular communication, such as telephony, SMS (Short Message Service), MMS (Multimedia Messaging Service), IMPS (Instant Messaging and Presence Service), e-mail or IMS (IP Multimedia Service), any originating user 9 can reach any terminating user 30 via routing capabilities 40, 50. The arrow 40 represents telephony, SMS, MMS or IMPS using e.g. E164, and the arrow 50 represents IMS using e.g. SIP URI.

When turning into providers of service content, a content provider may according to prior art act as an ordinary user. Such a situation is depicted in FIG. 2. A content provider 60 is here providing the original service content, which then is communicated to the end user 30 using the conventional routing capabilities. In the present disclosure, the expressions "content" or "service content" are used in a relatively broad meaning. Non-exclusive examples are e.g. media content, communication service content, advertisements, information service content etc.

The content provider may also have a more direct connection to the communication network operators. FIG. 3 illustrates a situation where a content provider 60 is going to provide its content to users 30 of more than one network operator 20. The content provider 60 establishes a relation to all the different network operators 20. The operators 20 may in a best case provide information 23 about access properties within the network and/or about capabilities of subscriber devices. A content modifier 65 of the content provider 60 can then use such information 23 to adapt the content, before the content is transferred, using the routing systems of the network operators. The content provider 60 has in such a concept to invest much effort in establishing operator relations and in modifying treatment. Furthermore, the network operators 20 also have to put efforts in achieving relations to all possible content providers.

Figure 4:
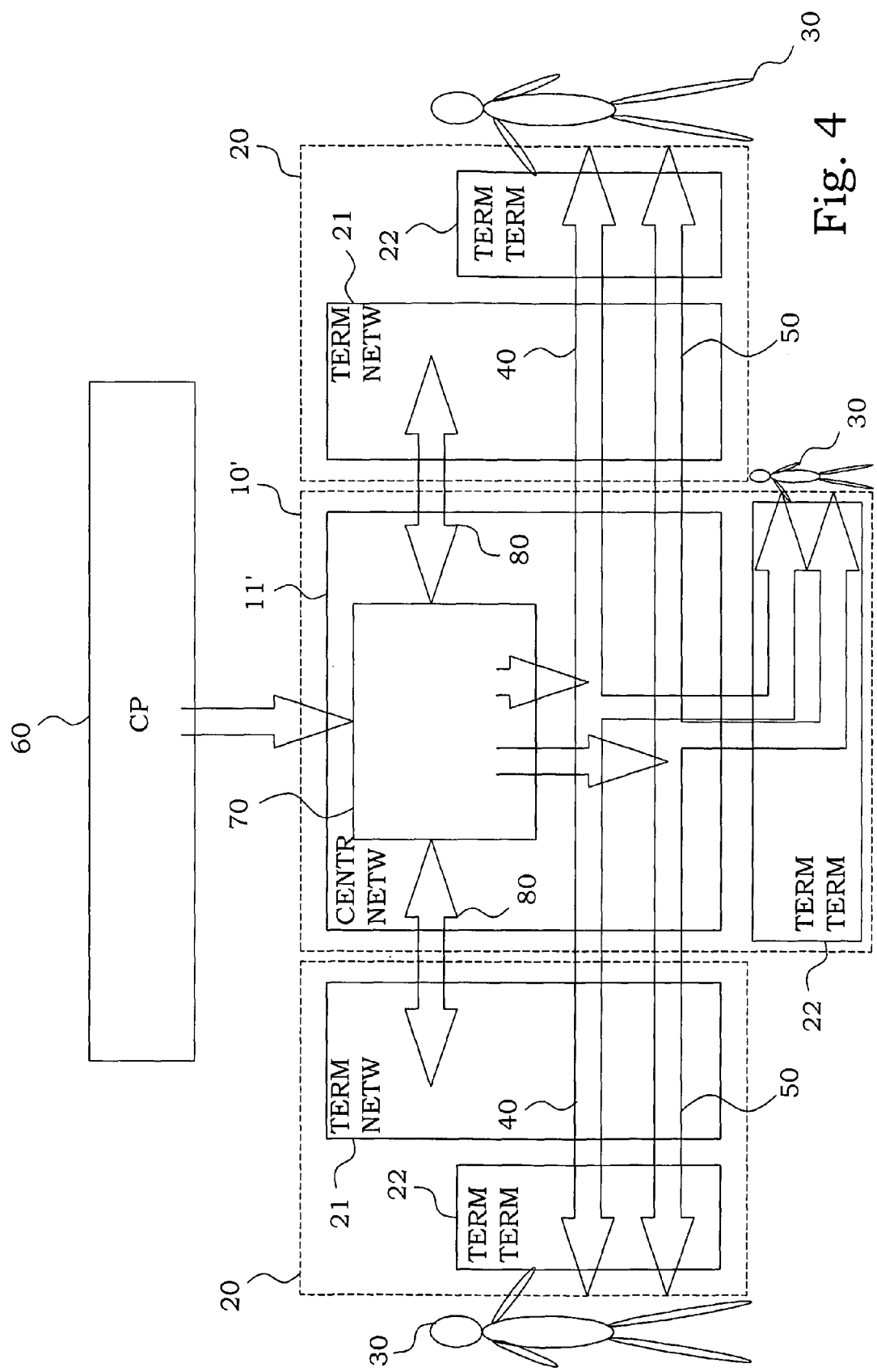
FIG. 4 is a block scheme of an embodiment of a system for content provision according to the present invention.

According to the present invention, an alternative configuration is proposed. FIG. 4 illustrates one embodiment of a system according to the present invention. The content provider 60 has established a single relation to one central or intermediate telecommunication network operator 10', in the present disclosure denoted as a central network operator administrating the operation. The word "administrating" should not be understood in such a sense that only not-technical procedure are performed, but instead in such a sense that the central network operator plays a central role in executing delivery of service content, even if not all functionalities are collected within the system. A central network 11' of the central network operator 10' comprises a content handling subsystem 70, arranged for administrating service content. This content handling subsystem 70 is typically implemented in a node, but can also be implemented in any other network device as well as as a distributed subsystem.

The central network operator 10' has established relations with other network operators 20 for enabling exchange 80 of certain subscriber attributes, such that subscriber position data, subscriber device information and/or subscriber access properties. Agreement between the operators determines the situations, data content, extent, economic compensation etc. under which such exchange 80 may take place.

The central network operator 10' has also established a relation to the content provider 60, governing the types of data, transfer technologies etc. for data exchanged between the central network operator 10' and the content provider 60. The content handling subsystem 70 receives content to be delivered to a number of users in the collective network of all operators. The content is modified to suit the different end users, their needs and capabilities in a best possible way by using the exchanged user attribute data 80. The modified content is then distributed using the conventional routing capabilities 40, 50.

The central network may also simultaneously function as a terminating network, when a user targeted for receiving the content is subscriber of the central network operator. This is illustrated by the bottom part, where a user terminating terminal 22 is illustrated within the central network operator 10'.

In such a configuration, an inter-operator relation can be reused for handling content from a multitude of content providers. At the same time, a content provider only has to establish one single operator relation. In other words, the configuration described above opens up for the operators to make collective use of the service/session/media routing anyone-to-anyone in their business setup between each other and with content providers.

The operators have an agreement on attribute sharing with each other, making it possible for one operator to ask for attribute values of another operator's user. The preferred technology for that is the 3GPP standardised Generic User Profile (GUP) solution, other candidates are the Liberty Alliance solution.

Figure 5:
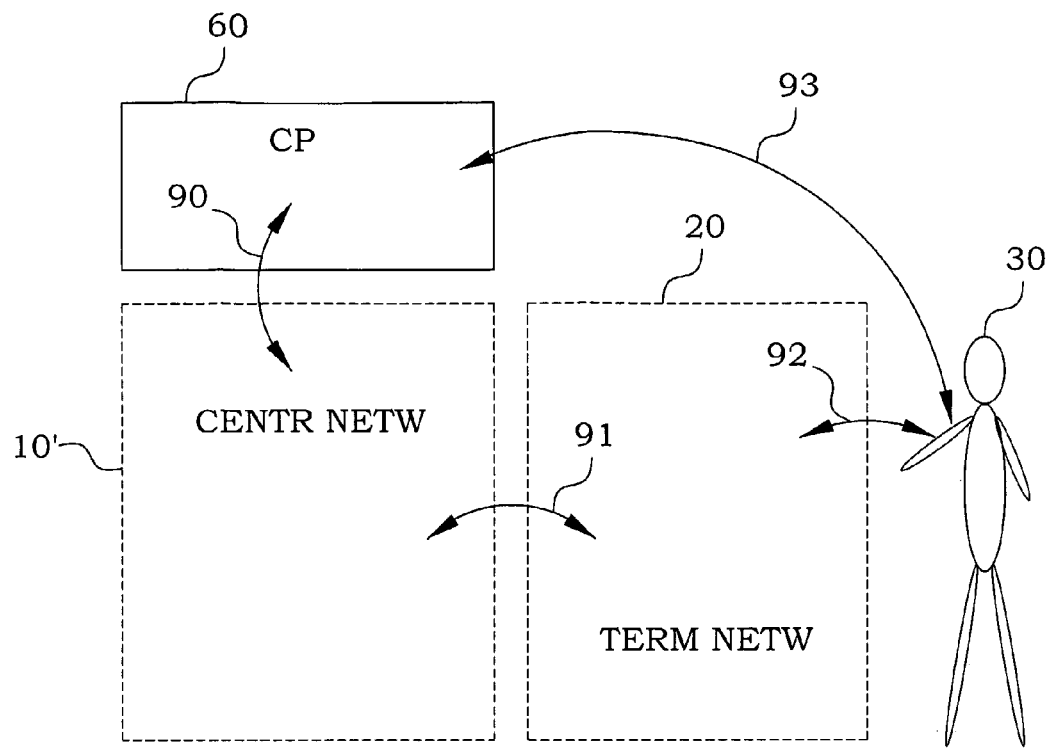
FIG. 5 is a block scheme illustrating relations between parties in a system for content provision according to the present invention.

The configuration of FIG. 4 relies on that a number of relations or agreements between different parties are established. This is schematically illustrated in FIG. 5. A user 30 has a subscriber relation 92 with a network operator 20. The subscriber relation 92 may comprise rules about to what extent user attributes are free to be used by the operator 20, i.e. privacy considerations. The subscriber relation 92 may also e.g. regulate to what extent economical transactions can be made by the operator 20 on behalf of the user 30.

The network operator 20 has an inter-operator relation 91 with a central network operator 10'. Such relation 91 governs, as mentioned above, what user attribute data can be exchanged, and under what conditions. Such relations 91 are typically symmetrical, i.e. any of the operators may act as a central network operator for different content providers. The relations 91 preferably also define formats and means for exchanging the information.

The central network operator 10' has a relation 90 to the content provider 60. This relation governs the task that the central network operator accepts to perform on behalf of the content provider 90. As being described further below, different divisions of responsibility can be feasible, and may also easily be coexisting. One relation 90 may cover a particular content or all contacts between a particular pair of content provider 60 and central network operator.

Finally, a relation 93 between the content provider 60 and the tentative user 30 has to be present. The relation 93 may be a direct relation, where commitments and conditions are agreed directly between the parties. However, by the influence of the other relations 90-92 of FIG. 5, the relation 93 can also be an indirect relation, where e.g. the central network operator 10' may act on behalf of the content provider 60 and/or the network operator 20 may act on behalf of the user 30, at least to some extent.

Figure 6A:
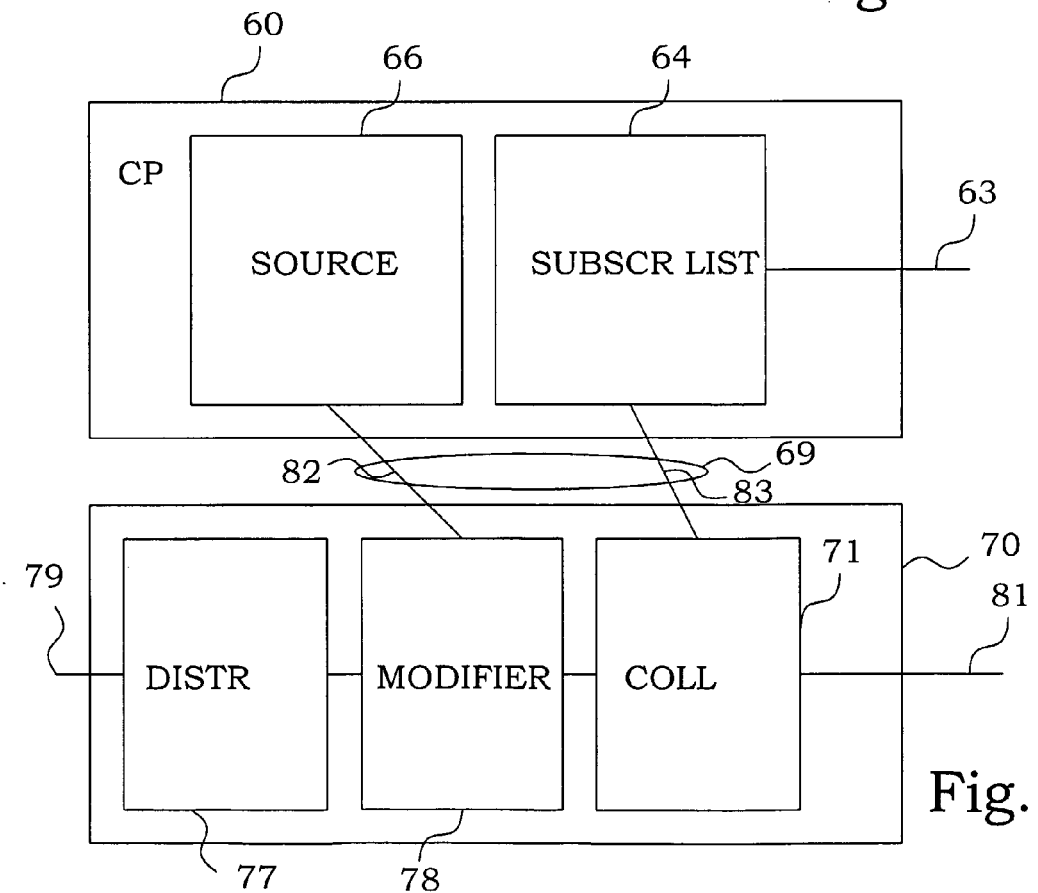
FIG. 6A is a block scheme of an embodiment of a content provider and an embodiment of a content handling subsystem of a central network operator according to the present invention.

The relation between the central network operator and the content provider determines the division of responsibilities between the content provider 60 system and the central network operator content handling subsystem 70. In FIG. 6A, a block scheme of one embodiment of the content provider 60 system and the content handling subsystem 70 is illustrated. The content provider 60 comprises a content source 66. The content of the content source 66 is intended for a multitude of users. A subscriber list compiler 64 uses connections 63 for achieving a list of users that are targeted for the content.

The content from the content source 66 is transferred 82 to a content modifying unit 78 of the content handling subsystem 70. Also the subscriber list or a representation thereof is transferred 83 from the content provider 60 to an attribute collector 71 of the content handling subsystem 70 over a content provider interface 69. The attribute collector 71 uses the inter-operator relations for requesting useful user attributes of the users present in the received subscriber list. Such communication takes place over inter-operator interfaces 81 adapted for management signalling with operators of a plurality of mobile communication network. The subscriber list accompanied by associated user attribute data is provided to the content modifying unit 78. In the content modifying unit 78, the content is modified to suit the different user attributes as good as possible. More detailed examples of such handling are given further below. The modified content together with subscriber lists indicating which user that should have what type of content is provided to a distributing means 77, which delivers the content over data traffic interfaces 79 adapted for communication with subscribers of the plurality of mobile communication networks.

In the embodiment of FIG. 6A, the content provider 60 has the main responsibility for the content as well as the provision of the subscriber list, whereas all further actions are handed over to the content handling subsystem 70. The content handling subsystem 70 here acts as a content broker.

Another embodiment, based on a different division of responsibilities, is illustrated in FIG. 6B. Here, the content provider 60 takes responsibility for both the actual provision of the original content as well as any modification to suit different targeted users. A content modifying unit 68 is thereby provided at the content provider 60. Instead, the responsibility for obtaining the list of tentative users is handed over the content handling subsystem 70. The content handling subsystem 70 thus comprises a subscriber list compiler 74 using connections 73 for achieving a list of users that are targeted for the content. The result of such targeting actions is then easily handed over to the attribute collector 71. The attribute collector 71 provides in this embodiment the subscriber list 84 accompanied by associated user attribute data to the content modifying unit 68 over the content provider interface 69. The content modifying unit 68 modifies the content according to the received information and returns modified content 85 to the content handling subsystem 70, which subsequently distributes the content.

In FIG. 6C, an embodiment of yet another responsibility division is illustrated. Here, the content provider 60 minimises its own participation. The content provider 60 here only provides the content handling subsystem 70 with the original content, whereby the content handling subsystem 70 performs all remaining steps in analogy with earlier embodiments.

It would even be possible in a further embodiment for the content provider to handling content provision, content modification as well as the final distribution. However, the content modification has to be supplied by input information about user attributes, which is to be collected and provided to the content provider by the central network operator. If the content provider also is responsible for compiling the user list, the central network operator just serves for attribute collection function.

In order to increase the understanding of the benefits of the methods and devices according to the present invention, a number of illustrative examples will be presented below. As a model situation, a concert event taking place in a limited concert area is used. A multitude of artists are going to perform on a stage and as an additional service for the spectators, the arranger of the concert has a film team operating back-stage, providing additional media material, such as interviews or just general back-stage film sequences.

Figure 7:
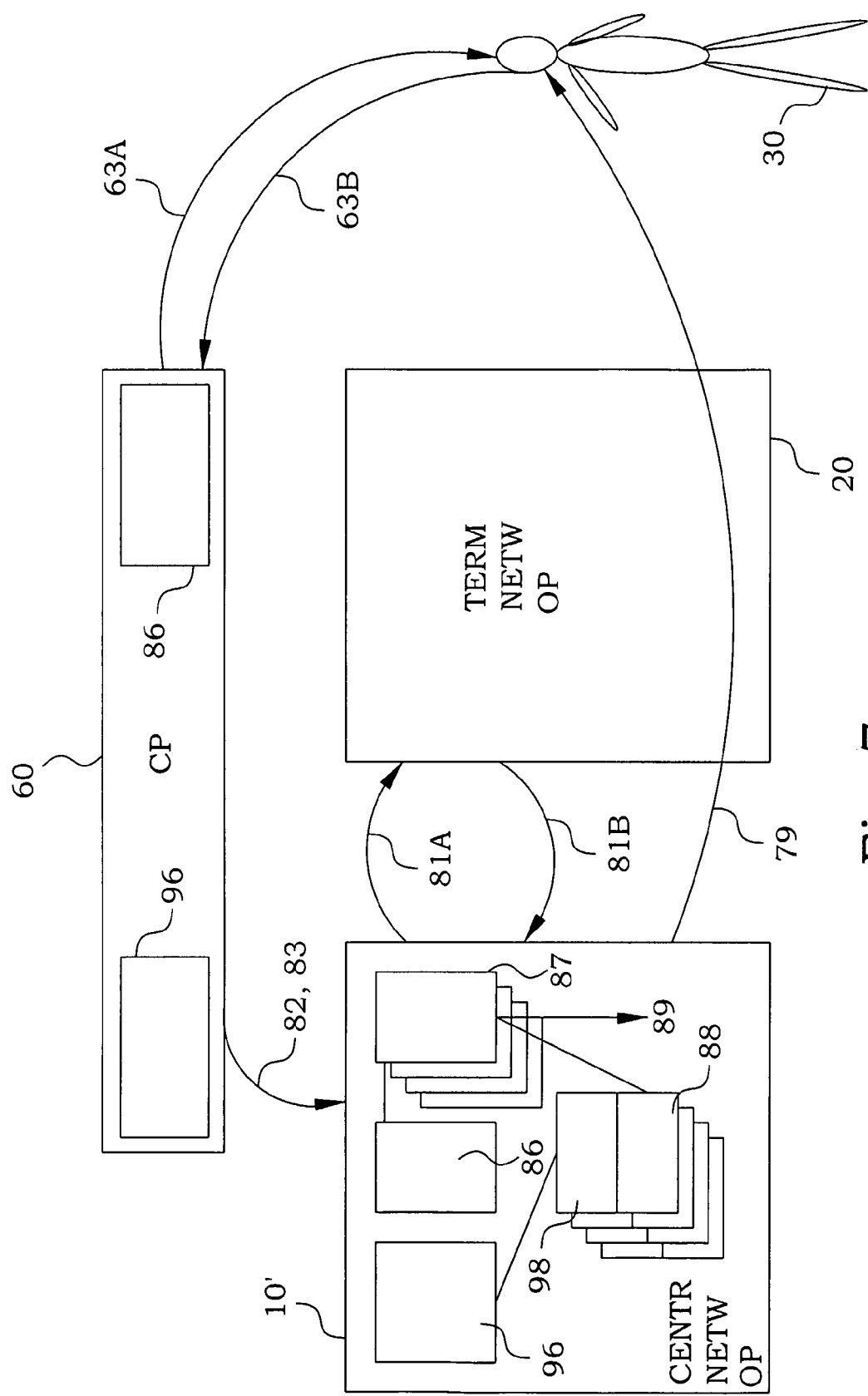
FIG. 7 is a schematic illustration of information flow in an embodiment of a system according to the present invention.

FIG. 7 schematically illustrates the different acting parties. The content provider 60 first has to reach possible targets for the additional media material. In advertisements at the entrance to the concert area as well as distributed over the concert area, the content provider informs that "films showing artists back stage" are available. In the advertisement, there is an instruction to send an SMS containing the word "BackStageFilms" to a specific telephone number. The films will then be delivered when available, if the user is present within the concert area. The area constriction will prohibit non-spectators to benefit from viewing interesting media content. The advertisement also tells what costs that are involved. This advertisement is illustrated by the arrow 63A.

A user 30 that is interested in having the back stage material replies 63B on the advertisement 63A, by sending an SMS to the specific phone number including the word "BackStageFilms". The specific phone number belongs to the content provider 60 and when the SMS is received, the content provider 60 detects the code word "BackStage-Films" and takes the originating SMS address, e.g. the MSISDN, of the SMS and adds that to a list 86 of users subscribing to the content delivery offer.

The concert starts, and the so does the work of the back stage film team. When the content provider 60 has any new content 96 to offer, it is sent 82, 83 together with the list 86 of MSISDNs of those subscribing to it to the central network operator 10'. The central network operator 10' (or the content handling subsystem of the central network operator) goes through the list 86 of MSISDNs and divides it according to operator responsible for each number into a list 87 per operator that has users in the original list 86. The central network operator 10' sends a request 81A to each operator in question, asking for position, capability of current device, capability of current access and preferred delivery method IMS or MMS. For users belonging to the central network operator 10' itself, such a request is of course handled internally.

The different terminating network operators 20 reply 81B on the requests 81A, providing user attribute data for the targeted users of respective operator. The central network operator 10' uses this received information to make a new division of the subscriber list. The subscriber list 86 is now divided into part lists 88, in which users having the same or similar demands on access and presentation capabilities are collected. For instance, a division between users that shall have the content delivered through MMS and those that shall have the content through IMS can be performed. Targeted users that are not present within the concert area are removed 89 from receiving the media content.

The central network operator 10' modifies the content to suit the different demands of the part lists 88, i.e. provides modified content 98 associated with respective part list 88. Finally, the central network operator 10' sends 79 the modified content to the users of the part lists 88 using conventional routing capabilities. In this particular example, a video MMS to each MSISDN on the MMS list and a streaming invite to each MSISDN on the IMS list. Generally, content can be modified and/or recoded to fit e.g. terminal screen size depending on terminal type or down-coded to fit e.g. reduced access capability.

The central network operator 10' also typically handles charging activities. Both the above described delivery actions are e.g. marked for B-party charging and assigned a charging value, corresponding to the values advertised by the content provider. The terminating network operator 20 bills the user 30 or debiting their prepaid accounts for the delivered content according to the provided charging value. The central network operator 10' bills the terminating network operator 20 for the delivered content according to their accounting agreements. Finally, the central network operator 10' delivers the collected sum charged for the delivery to the content provider 60 according to their mutual agreement.

Anyone skilled in the art understands that the above illustration corresponds to a system e.g. according to FIG. 6A, where the content provider is responsible for compiling the list of users and where the central network operator is responsible for the content modification. If other responsibility division, such as e.g. the ones presented in FIGS. 6B and 6C, the information streams will be modified accordingly.

The above illustrative example presents content distribution on a very basic level. Further aspects can also be considered. The issue of guaranteed quality is a delivery requirement that can be considered. Such aspect is required in cases of e.g. network congestion and when the content is sold with delivery guarantee. This is easily included in the configuration above. The request 81A for user attributes will then also include a request for information about if the user has subscribed to guaranteed quality delivery. Upon receiving the attributes, the central network operator 10' creates part lists 88 also based on guaranteed quality delivery status. When delivering the modified content, the deliveries to users that have guaranteed quality delivery are marked accordingly.

Digital Rights Management (DRM) is also an important factor to attract lasting high valued content to the market. In this context it is a matter of checking the DRM level present in the terminal delivered to. This can be treated as an attribute among other attributes within the above scheme. The ability to push a higher DRM capacity to the terminal could also be incorporated as a step.

As an example; the content provider consider the content valuable and decides to require DRM capability level 2 in the user device, in order for the subscription to be valid. The central network operator 10' sends an attribute request asking about DRM level available in the device the user is using and requiring it to be at least of level 2. The terminating network operator 20 checks the user device capability. If the user device is DRM level 2 compatible, this information is returned. If the level is less than 2, then the terminating network operator 20 tries to update the device to fulfil level 2, if possible. If the update successes, level 2 compatibility is returned, otherwise the terminating network operator 20 returns a DRM level less than 2. The central network operator 10' processes the returned DRM levels, and if the level is less than 2, the central network operator 10' removes the user from the lists of users that will be provided with the content. Preferably, an indication of the removal and the reason for it is transferred to the user 30.

Privacy, i.e. the question about what information that is allowed to be distributed to other parties, is another issue that can be incorporated within the scheme above. Privacy is an addition of large relevancy, since it typically is considered that it is required in some form to protect the user integrity. As mentioned further above, at least a part of the user privacy may be governed by the subscriber agreement or other relation between the operator and the user. Such regulations may concern general privacy, i.e. not towards any other particular extern party or at any particular event. It is, however, not very common to allow operators to handle user attributes totally free with respect to external parties. In such cases, a general privacy restriction is typically present, prohibiting the network operator to distribute user attributes to external parties only according to his own considerations. For the scheme of the present invention to operate properly also under such circumstances, such obstacles may be temporarily removed by using event or party associated privacy handling schemes according to the following description, which is schematically illustrated by FIG. 8.

Figure 8:
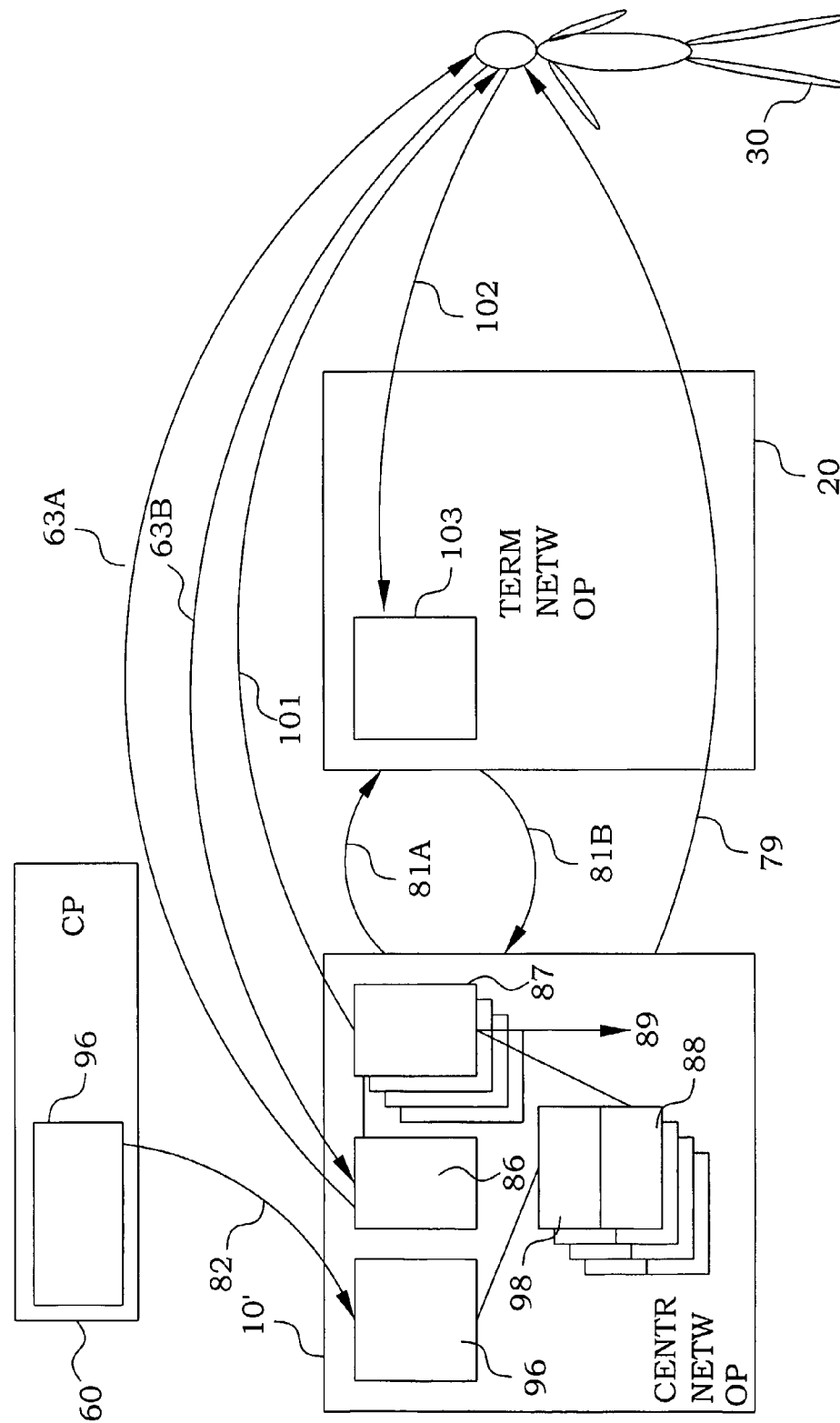
FIG. 8 is a schematic illustration of information flow in an embodiment of a system according to the present invention comprising privacy scripts.

In the embodiment of FIG. 8, the compiling of the subscriber list is handled by the central network operator 10'. The advertisement 63A and the reception of the replies 63B are thus controlled by the central network operator 10'. This means that the list of targeted subscribers 86 is built up at the operator. When the central network operator 10' receives the reply 63B, an automated privacy configuration is activated in the present embodiment. The central network operator 10' sends an automated privacy configuration script 101 to the "from" address in the SMS, i.e. a targeted user, via e.g. MMS. The scripts are accompanied by a request to forward 102 that script to a defined address 103 at the user's operator 20. This script provides the ability for the user's operator 20, i.e. the terminating operator, to the validity of coming attribute requests from the central network operator 10'. Scripts configuring privacy are required to be signed by the creator. The terminating operator checks that it is created by a trusted entity and signed by the user.

When the central network operator 10' sends the request 81A for user attributes, the terminating operator 20 checks the validity of the attribute requests against each users privacy configuration 103. For those users that are present in the privacy configuration list 103 and have the proper privacy setting, the requested attribute values are returned 81B. The central network operator 10' sorts out users 89 that do not have any suitable privacy configuration, i.e. where no user attributes are returned. In an alternative implementation, the central network operator 10' may create separate a part list of users having no suitable privacy configuration. The content to be distributed to the users of that part list is then modified to suit a "lowest" possible level of terminal and network access capabilities.

Due to the above script handling procedure, a privacy level approved by the user at all instances, can be used to provide a best possible choice of distribution.

Figure 10:
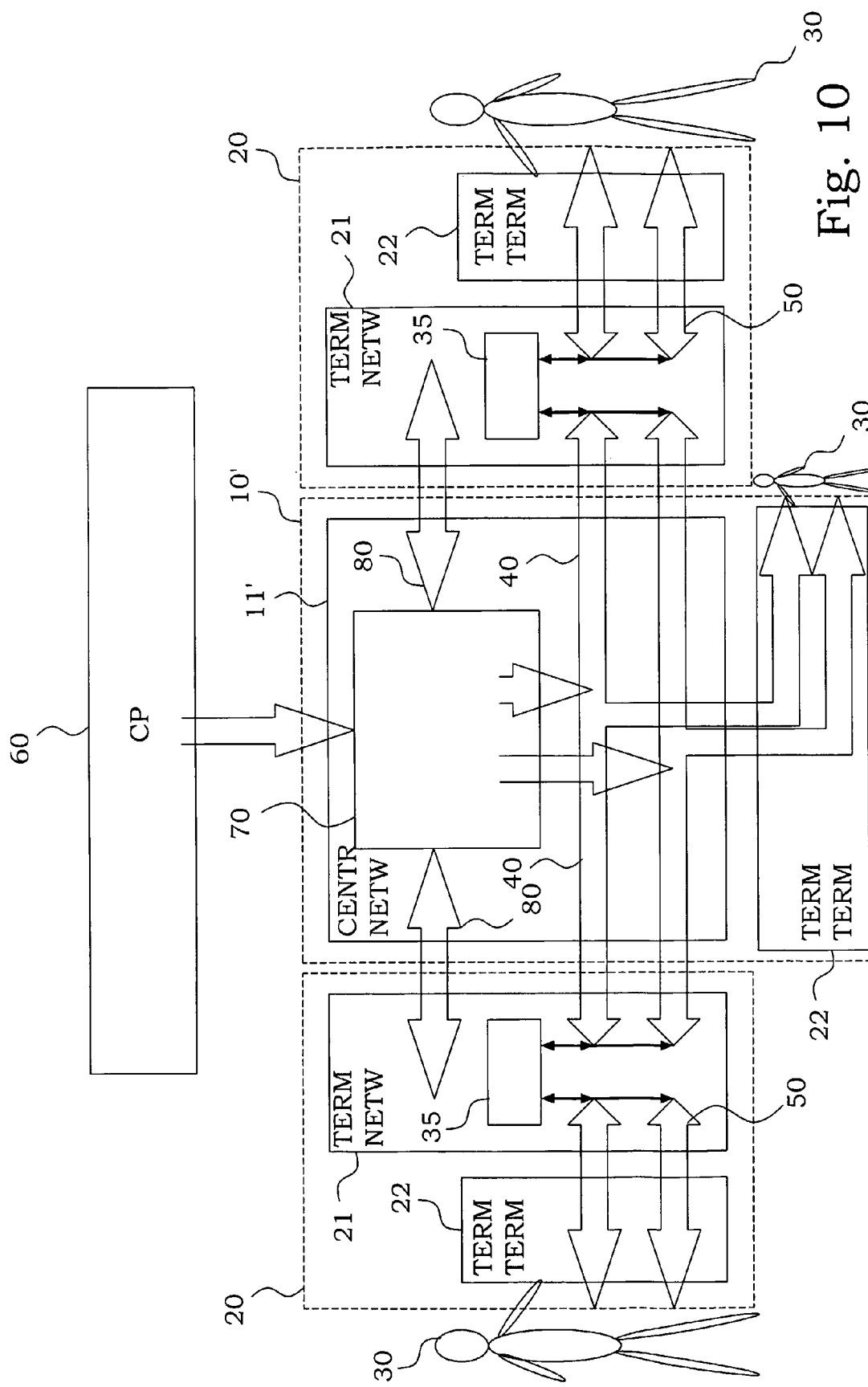
FIG. 10 is a block scheme of an embodiment of a system for content provision according to the present invention, enabling anonymity.

In some situations, a user may also want to maintain its anonymity, although still wanting to achieve the content. For instance, if the subscriber does not know whether the content provider is an operator that can be trusted, the subscriber may choose not to reveal its true identity for the content provider. In other words, the subscriber wants to achieve availability to the content, however, not revealing its own identity. Also anonymity schemes may then be comprised in the above configuration, using subsystems in the central network operator 10' or the terminating network operator 20 as anonymity preserving subsystems. One embodiment of such a system is illustrated in FIG. 10. The terminating networks 21 of the network operators 20 then comprises an anonymity port 35. The anonymity port 35 comprises functionality for providing temporary time-limited associations between a subscriber address and a temporary routing address. This association information is not available through any user attribute data exchange.

The operation of the anonymity port 35 is easiest understood by studying an example. When a content provider 60 advertises the content services, also information about anonymous subscriptions is provided. The advertising could e.g. comprise the information "Anonymous subscription is accepted. Include "0701234567" and send the SMS to your operator's anonymity port." The user sends an SMS to its home operator anonymity port 35 with the content provider SMS address 0701234567 and an identification for the actual content of interest. The operator 20 anonymity port 35 selects a temporary routing number and associates that with the "from" address of the received SMS. Routing numbers are preferably structured so that they can be understood that they are routing numbers and not ordinary telephone numbers. The operator 20 forwards any call or message addressed to the routing number to the associated original address for the validity time of the association. The anonymity port 35 also forwards the SMS to the content provider address "0701234567". The central network operator 10' takes the "from" address in the SMS, i.e. now the routing number, and adds that to the list of users subscribing to the content delivery offer.

When the central network operator 10' requests user attributes of the subscriber, the anonymity port 35 can translate the routing number into the original number and provide, if permitted, the correct user attributes 80 to the central network operator 10'. Still, the identity of the end user 30 is not revealed, just which operator he belongs to. When the actual content is distributed, the content will be addressed to the routing address, which brings the content to the anonymity port 35. The anonymity port 35 forwards the content to the subscriber 30, using its internal association.

In such an arrangement, any charging for the content has to pass via the terminating network operator 20.

Figure 9:
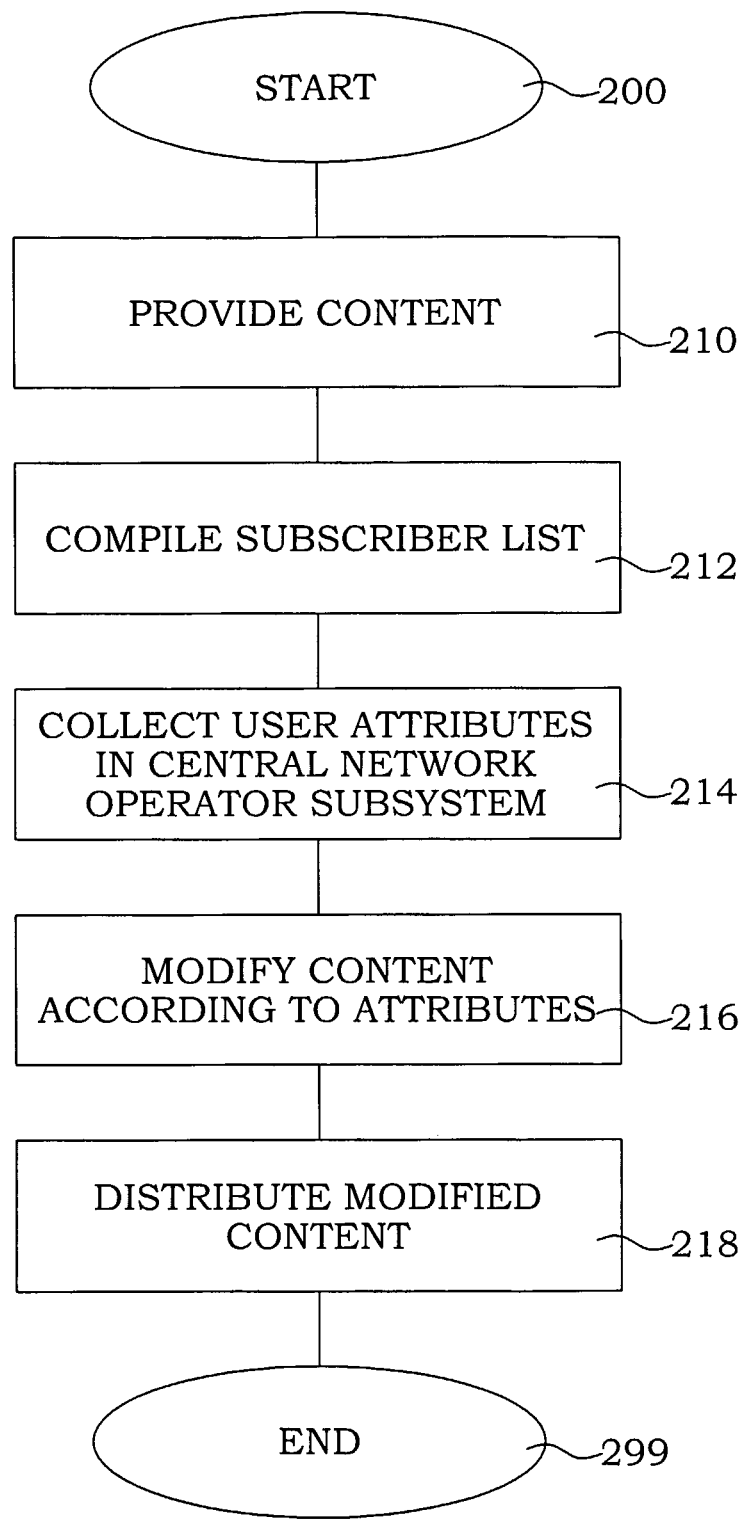
FIG. 9 is a flow diagram of main steps of an embodiment of a method according to the present invention.

FIG. 9 is a flow diagram of main steps of an embodiment of a method according to the present invention. The procedure starts in step 200. In step 210 service content, e.g. media content, is provided. This is typically performed by or from a content provider. A subscriber list of targeted users is compiled in step 212. Such step can be provided either by the content provider, or by a subsystem of a central network operator. User attributes of users that are listed in the subscriber list are collected in step 214. This step is performed in the subsystem of the central network operator, using inter-operator relations for the governing the request-reply activities. Depending of e.g. privacy agreements of the users, all or a part of the requested information is collected in the subsystem of the central network operator. The service content is in step 216 modified in order to suit the different users at the subscriber list, depending on the collected user attributes. This step can be performed by the content provider supported by attribute information from the central network operator as well as by the central network operator when the content provider has provided the content. Finally, in step 218, the modified content is distributed to users of the subscriber list. The modified content is then modified according to the user attributes of respective user. The procedure ends in step 299.

The structure described here enable a market structure where one operator to act as administrator for the operator collective, thus making it possible for an application industry to be innovative and grow faster. The operators are still in control as they are providing the most of the information regarding their users as well as configure the basic capability needed.

Agreements between operators are required. These agreement covers generics interconnect aspects on session routing level and enabler level as well as general attribute sharing capability. The ways these are used in a service context are not part of the agreement and need only to be known on one side of the relation. Privacy is furthermore considered as a generic service provided by each operator to their customers.

The structure enables the different operators to act and develop independently thus removing the time consuming activity of standardizing on a service level. Another advantage is that single services need not be implemented at all operators in order to work across all users.

An important aspect of the invention is the way standardised interface solutions are combined to provide the overall capabilities and characteristics making it possible for each operator to reach all users regardless of the operator relation.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. A method for distributing service content, comprising the steps of:
   providing service content;
   compiling a list of subscribers to which said service content is to be distributed;
   collecting information about said subscribers by
      collecting, in a central network operator subsystem, subscriber attributes for said subscribers on said list from operators of a plurality of mobile communication networks, said central network operator subsystem also functioning as a terminating network; and
      modifying said service content according to said collected subscriber attributes to suit said subscriber attributes; and
   distributing, to subscribers on said list, said service content by distributing said service content modified according to respective subscriber attributes.

2. The method according to claim 1, wherein said service content comprises at least one item of the list of:
   media content;
   communication service content;
   advertisements; and
   information service content.

3. The method according to claim 1, wherein said subscriber attributes comprises subscriber position data.

4. The method according to claim 1, wherein said subscriber attributes comprises subscriber device information.

5. The method according to claim 4, wherein said subscriber device information comprises information about digital rights management.

6. The method according to claim 1, wherein said subscriber attributes comprises subscriber access properties.

7. The method according to claim 6, wherein said subscriber access properties comprises information about IP Multimedia Service or Multimedia Messaging Service access.

8. The method according to claim 1, wherein said step of collecting is governed by mutual operator agreements.

9. The method according to claim 1, wherein said step of compiling takes place in said central network operator subsystem.

10. The method according to claim 1, wherein said step of compiling is performed by a service content provider.

11. The method according to claim 10, comprising the further step of transferring said compiled list to said central network operator subsystem.

12. The method according to claim 1, wherein said step of modifying takes place in said central network operator subsystem.

13. The method according to claim 1, wherein said step of modifying is performed by a service content provider.

14. The method according to claim 13, comprising the further step of transferring said modified service content to said central network operator subsystem.

15. The method according to claim 1, wherein said step of delivering is performed by said central network operator subsystem.

16. The method according to claim 1, wherein said step of modifying in turn comprises the steps of:
dividing said compiled list in part lists according to predetermined common subscriber attributes; and
modifying said service content for each said part list according to said predetermined common subscriber attributes.

17. The method according to claim 1, further comprising the steps of:
providing a privacy configuration script to subscribers on said list of subscribers;
said privacy configuration script being intended for signing by said subscriber;
said privacy configuration script being accompanied by an address at an operator of said subscriber, to which said subscriber is intended to forward said signed privacy configuration script.

18. The method according to claim 1, wherein communication between at least one of said subscribers on one hand and said central network operator and said content provider on the other hand takes place via an anonymity port of an operator of which said at least one of said subscribers is a subscriber,
whereby a temporary routing address is used for identify said at least one of said subscribers.

19. A mobile communication network subsystem, comprising:
content provider interface adapted for service content provider communication,
inter-operator interfaces adapted for management signaling with operators of a plurality of mobile communication networks;
data traffic interfaces adapted for communication with subscribers of said plurality of mobile communication networks;
means for obtaining a list of subscribers of said plurality of mobile communication networks to which service content is to be distributed;
a central network operator subsystem for collecting subscriber attributes for subscribers on said list of subscribers through said inter-operator interface, said central network operator also subsystem functioning as a terminating network; and
means for delivering said service content modified according to a respective subscriber attribute to suit said subscriber attribute over said data traffic interfaces.

20. The mobile communication network subsystem according to claim 19, wherein said service content comprises at least one item of the list of:
media content;
communication service content;
advertisements; and
information service content.

21. The mobile communication network subsystem according to claim 19, further comprising:
means for receiving said service content through said content provider interface; and
means for modifying said service content according to subscriber; attributes for subscribers on said list.

22. The mobile communication network subsystem according to claim 21, wherein said means for modifying said service content in turn comprises:
means for dividing said compiled list in part lists according to predetermined common subscriber attributes; and
means modifying said service content for each said part list according to said predetermined common subscriber attributes.

23. The mobile communication network subsystem according to claim 19, further comprising:
means for transferring data representing at least parts of said collected subscriber attributes over said content provider interface; and
means for receiving said service content modified according to subscriber attributes for subscribers on said list over said content provider interface.

24. The mobile communication network subsystem according to claim 19, wherein said means for obtaining a list of subscribers comprises means for receiving data representing said list of subscribers over said content provider interface.

25. The mobile communication network subsystem according to claim 19, wherein said means for obtaining a list of subscribers comprises means for receiving and processing SMS messages.

26. The mobile communication network subsystem according to claim 19, further comprising:
means for providing a privacy configuration script over said data traffic interfaces targeted for subscribers on said list of subscribers;
said privacy configuration script being intended for signing by said subscriber;
said means for providing a privacy configuration script being further arranged to enclose an address at an operator of said subscriber, to which said subscriber is intended to forward said signed privacy configuration script.

27. A mobile communications system comprising
a mobile communication network subsystem comprising a content provider interface adapted for service content provider communication, inter-operator interfaces adapted for management signaling with operators of a plurality of mobile communication network;

data traffic interfaces adapted for communication with subscribers of said plurality of mobile communication networks;

means for obtaining a list of subscribers of said plurality of mobile communication networks to which service content is to be distributed;

a central network operator subsystem for collecting subscriber attributes for subscribers on said list of subscribers through said inter-operator interface, said central network operator subsystem also functioning as a terminating network; and means for delivering said service content modified according to a respective subscriber attribute to suit said subscriber attribute over said data traffic interfaces.

28. The mobile communications system according to claim 27, further comprising an anonymity port wherein a temporary routing address is associated with an address for at least one of said subscribers, whereby communication between said at least one of said subscribers on one hand and a central network operator and said content provider on the other hand takes place via said anonymity port.

* * * * *

UNITED STATES PATENT AND TRADEMARK OFFICE
CERTIFICATE OF CORRECTION

PATENT NO. : 9,537,960 B2
APPLICATION NO. : 11/910361
DATED : January 3, 2017
INVENTOR(S) : Widmark et al.

Page 1 of 1

It is certified that error appears in the above-identified patent and that said Letters Patent is hereby corrected as shown below:

On the Title Page

In Item (75), under "Inventors", in Column 1, Line 2, delete "Jarfalla (SE);" and insert -- Järfälla (SE); --, therefor.

In Item (75), under "Inventors", in Column 1, Lines 2-3, delete "Steinar Dahlin, Jarfalla (SE);" and insert -- Steinar Dahlin, Deceased, Järfälla (SE); --, therefor.

In Item (75), under "Inventors", in Column 1, Lines 3-5, delete "Jarfalla (SE);" and insert -- Järfälla (SE) --, therefor.

In the Specification

In Column 4, Line 63, delete "content provider 90." and insert -- content provider 60. --, therefor.

In Column 6, Line 49, delete "the so" and insert -- so --, therefor.

In Column 9, Line 64, delete "Depending of" and insert -- Depending on --, therefor.

Signed and Sealed this
Seventh Day of April, 2020

Andrei Iancu
*Director of the United States Patent and Trademark Office*